United States Patent Office.

GEORGE C. FURBER, OF YREKA, CALIFORNIA.

*Letters Patent No. 104,727, dated June 28, 1870.*

IMPROVED MEDICAL COMPOUND.

The Schedule referred to in these Letters Patent and making part of the same

*To whom it may concern:*

Be it known that I, GEORGE C. FURBER, of Yreka, in the county of Siskiyou and State of California, have invented a new and useful Improvement in Medical Compound; and I do hereby declare that the following is a full, clear, and exact description thereof, which will enable others skilled in the art to make and use the same.

This invention and discovery relate to a new and useful composition for medicinal purposes, and consist in combining the substances or materials as hereinafter mentioned, in the manner described.

In carrying out my invention and discovery, I use, for making seven and a half gallons of the compound, dry leaves of "mountain balm," three pounds, three ounces; young roots of Oregon grape, dried and pulverized, three ounces three drams; "red sanders," for coloring, one ounce one dram; pulverized cochineal, one ounce three drams. Make a tincture by turning on six gallons alcohol and pure water, equal parts.

Macerate at a temperature of 70° or 80° Fahrenheit, for four days.

To the above I add two gallons strained whey of buttermilk, or sour milk, after the whey has been exposed to the open air in a glass vessel for the space of four days, at the above-mentioned temperature. The alkaloids thereof are immediately coagulated and precipitated.

After the compound is well settled, the supernatant clear liquid is drawn off with a siphon. The residue is pressed, filtered, and mixed with the compound, when the medicine is ready for use.

I do not confine myself strictly to the proportions named above, nor strictly to the mode of preparing the compound.

Having thus described my invention,

I claim as new and desire to secure by Letters Patent—

The above-mentioned medical compound, composed and prepared substantially as and for the purposes herein described.

GEORGE C. FURBER.

Witnesses:
JAMES H. VOGAN,
DAVID H. SHAW.